(12) United States Patent
Di Lollo

(10) Patent No.: US 8,091,845 B2
(45) Date of Patent: Jan. 10, 2012

(54) HOLDER FOR RECEIVING A LID OR A COVER

(75) Inventor: Stefano Di Lollo, Montreal (CA)

(73) Assignee: Trudeau Corporation 1889 Inc., Boucherville, Québec (CA)

( * ) Notice: Subject to any disclaimer, the term of this patent is extended or adjusted under 35 U.S.C. 154(b) by 90 days.

(21) Appl. No.: 12/696,525

(22) Filed: Jan. 29, 2010

(65) Prior Publication Data

US 2010/0237208 A1   Sep. 23, 2010

Related U.S. Application Data

(60) Provisional application No. 61/161,998, filed on Mar. 20, 2009.

(51) Int. Cl.
*A47B 96/06* (2006.01)

(52) U.S. Cl. .................. 248/213.2; 248/176.1; 248/37.3; 248/226.11; 248/316.1; 248/316.8; 211/41.1

(58) Field of Classification Search .................. 248/17.6, 248/176.1, 37.3, 302, 226.11, 228.7, 231.81, 248/213.2, 316.1, 316.8; 211/41.4, 41.2; 24/332, 509, 343, 334

See application file for complete search history.

(56) References Cited

U.S. PATENT DOCUMENTS

| | | | | |
|---|---|---|---|---|
| 807,840 A * | 12/1905 | Martin et al. | ................. | 248/37.6 |
| 1,928,995 A | 10/1933 | De Biasi | | |
| 2,919,086 A * | 12/1959 | McMahan | ................. | 248/37.6 |
| 3,163,385 A | 12/1964 | Lazan, Jr. | | |
| 3,931,668 A | 1/1976 | Hombach | | |
| 3,983,602 A * | 10/1976 | Barry | ................. | 24/11 R |
| 4,911,310 A * | 3/1990 | Raishe et al. | ................. | 211/41.2 |
| 5,361,463 A * | 11/1994 | Revis | ................. | 24/543 |
| 5,592,244 A * | 1/1997 | Vyhmeister | ................. | 351/158 |
| 6,691,374 B2 * | 2/2004 | Coyne | ................. | 24/3.3 |
| 7,607,627 B1 * | 10/2009 | McHatet | ................. | 248/316.7 |
| D618,958 S * | 7/2010 | Di Lollo | ................. | D7/388 |

* cited by examiner

*Primary Examiner* — Anita M King
(74) *Attorney, Agent, or Firm* — Woodcock Washburn LLP

(57) ABSTRACT

A holder comprising a first portion and a second portion. The first portion has a base, a first wall and a second wall. The first and second walls extend upwardly from the base to define a space for receiving at least partially a lid or a cover. The second portion has a first member extending downwardly from the second wall and a second member with a bridge extending between the first and second members. The second member has a lever portion and a grasping portion. In use, the grasping portion is movable between a first position, where a gap is formed between the grasping portion and the first member, and a second position, where the grasping portion is biased towards the first member.

19 Claims, 4 Drawing Sheets

HOLDER FOR RECEIVING A LID OR A COVER

CROSS-REFERENCE TO RELATED APPLICATIONS

This application claims priority to U.S. Provisional Application No. 61/161,998, which was filed on Mar. 20, 2009, the contents of which are incorporated herein by reference in their entirety.

TECHNICAL FIELD

The present invention relates to a holder comprising a first portion for receiving a lid or a cover and a second portion for grasping a wall of a pot or vessel.

BACKGROUND

When cooking with a pot or other vessel that has a lid or other cover, it is often necessary to cover and uncover the pot or vessel to perform various acts. For example, it may be desirable to cover the vessel while heating its contents while it may later be necessary to uncover it to add ingredients or stir the contents. However, when a pot or vessel is uncovered, the lid or cover must be placed somewhere. If the lid or cover may has accumulated condensate or other liquids, such as splashed sauce, on its underside while covering the pot or vessel, putting it down on the counter may soil the counter. Furthermore, placing the lid on a potentially unclean environment, such as a counter that is not as clean as kitchenware, may potentially pose a hygiene risk as it may soil the underside of the lid or cover. When the soiled lid is returned upon the pot or vessel to cover it, it may accumulate condensate which may drip back into the pot or vessel.

U.S. Pat. No. 1,928,995 discloses a combined lid and utensil holder made of a wire-like material. This device suffers from many drawbacks: it is difficult to install and uninstall from a pot wall, it is aesthetically unpleasant and it also suffers from poor stability.

U.S. Pat. No. 3,163,385 discloses a multipurpose clip for kitchen utensils. This devise suffers from many drawbacks as well: the lid must be angled inward such that it covers the pan and prevents or impedes access to the pan contents. Furthermore, the device suffers from poor stability and is aesthetically unpleasing.

U.S. Pat. No. 3,931,668 discloses a holder for a kitchen utensil that can be used to hold a spoon over a bowl, but is wholly unsuitable for use with lids or other covers.

In the context of the above, it can be appreciated that there is a need in the industry for an improved holder.

SUMMARY

As embodied and broadly described herein, the present invention provides a holder comprising (a) a first portion comprising a base, a first wall and a second wall, said first and second walls extending upwardly from said base such that said first and second walls and base define a space for receiving at least partially a lid or a cover and (b) a second portion having a first member extending downwardly from said second wall and a second member with a bridge extending between said first and second members, said second member comprising a lever portion and a grasping portion, wherein, in use, said grasping portion is movable between a first position, wherein a gap is formed between said grasping portion and said first member for receiving a wall of a pot or vessel, and a second position, wherein said grasping portion is biased towards said first member for maintaining in place said holder when said holder is mounted on the pot or vessel.

The invention also provides a holder comprising an internal member made of stainless steel and an external body made of food grade silicone, the holder being mountable on a pot or a vessel and comprising: (a) a first portion comprising a base, a first wall and a second wall, the first and second walls extending upwardly from the base such that the first and second walls and base define a space for receiving at least partially a lid or a cover; and (b) a second portion having a first member extending downwardly from the second wall and a second member with a bridge extending between the first and second members, the second member comprising a lever portion and a grasping portion, wherein, in use, upon pressure of a user on the lever portion, the grasping portion moves towards a first position wherein a gap is formed between the grasping portion and the first member and wherein, when the user no longer applies pressure on the lever portion, the grasping portion moves towards a second position wherein the grasping portion is biased towards the first member.

This and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which.

Figure 1:
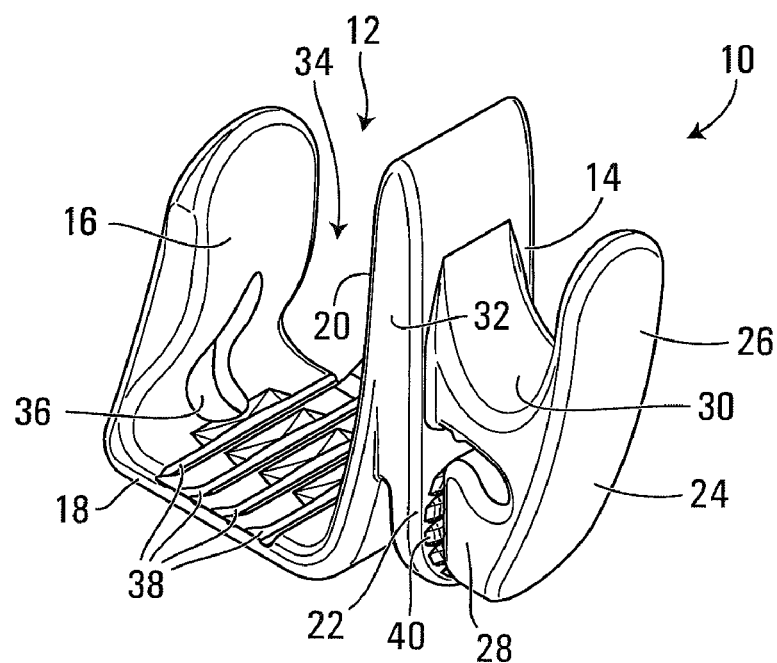
FIG. 1 shows a front perspective view of a holder in accordance with a non-limiting embodiment.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF ILLUSTRATIVE EMBODIMENTS

To facilitate the description, any reference numeral designating an element in one figure will designate the same element if used in any other figures. In describing the embodiments, specific terminology is resorted to for the sake of clarity but the invention is not intended to be limited to the specific terms so selected, and it is understood that each specific term comprises all equivalents.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure. Similarly, the terms "inwardly," "outwardly" and "radially" generally refer to the orientation of a surface relative to its axis of elongation, or axis of rotation, as appropriate.

FIGS. 1 to 7 show an example of a holder 10 suitable for holding a lid or a cover, of a cooking receptacle. In one embodiment described herein, the holder 10 is used for holding the lid of a pot. However, it should be understood that the holder 10 is not meant to be restricted for use with a certain type of cover or vessel. Indeed, the holder 10 may be used to hold any suitable covering for any of a number of other receptacles such as certain pans, bowls, cauldrons, kettles, buckets, basins and generally any vessel having a lateral wall and a cover.

The holder 10 has a first portion 12 for holding the lid or cover and a second portion 14 for grasping a wall of a pot or vessel.

The first portion 12 has a first wall 16, a base 18 and a second wall 20. In the example shown, the base 18 is a wall extending from the lower end of the second wall 20 to the lower end of the first wall 16. A receiving space 34 is defined between the rear wall 16, base 18 and second wall 20. When the holder 10 is affixed to the side of a pot, the pot lid can be placed into the space 34 such that it rests against the base 18. The base 18 extends sufficiently away from the second wall 20, and the second wall 20 extends sufficiently vertically that the lid can be leaned against the second wall 20 and thus lean outwardly from the pot center. The first wall 16 and the second wall 20 may be disposed at an angle relative to the base 18 that is between 90° and 110°. Advantageously, when the lid is leaned outwardly, it does not cover a very large surface of the pot opening and access to the pot interior by kitchen tools and cooking ingredients is not impeded.

In order to prevent the lid from slipping off the base 18, grip grooves 38 may be provided on the top surface of the base 18. It is understood that the term grip groove is meant to encompass any irregularity in the surface of the base 18, including grooves, treads, ridges, depressions or protuberances, which has the effect of increasing grip or friction for a pot lid resting thereon. Here the grip grooves 38 include a combination of transversal grooves, transversal ridges and angled protuberances. Furthermore, as best shown on FIGS. 3, 4, 5 and 6, the grip grooves 38 comprise lateral extensions 42 extending outwards and upwards from the base 18 for stabilizing the pot lid in the lateral direction and prevent the pot lid from rolling off or sliding off. Grip grooves 38 are configured here to impede sliding of the pot lid along the surface of the base 18 in every direction and to impede the rolling of the pot lid. It is to be understood that in a simpler design, grip grooves may be provided that merely prevent forward-backward sliding, side-to-side sliding, or rolling. Furthermore, instead of lateral extensions 42, the base 18 itself may be curved so as to extend upwardly on its lateral sides to impede lid rolling or sliding.

Figure 2:
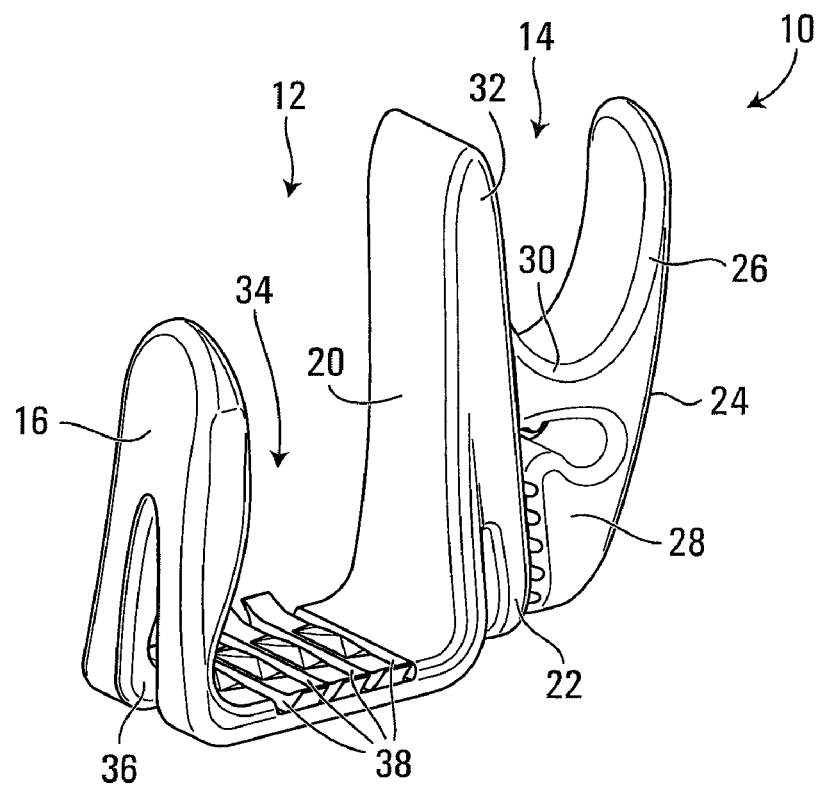
FIG. 2 shows a rear perspective view of the holder shown in FIG. 1.
Figure 3A:
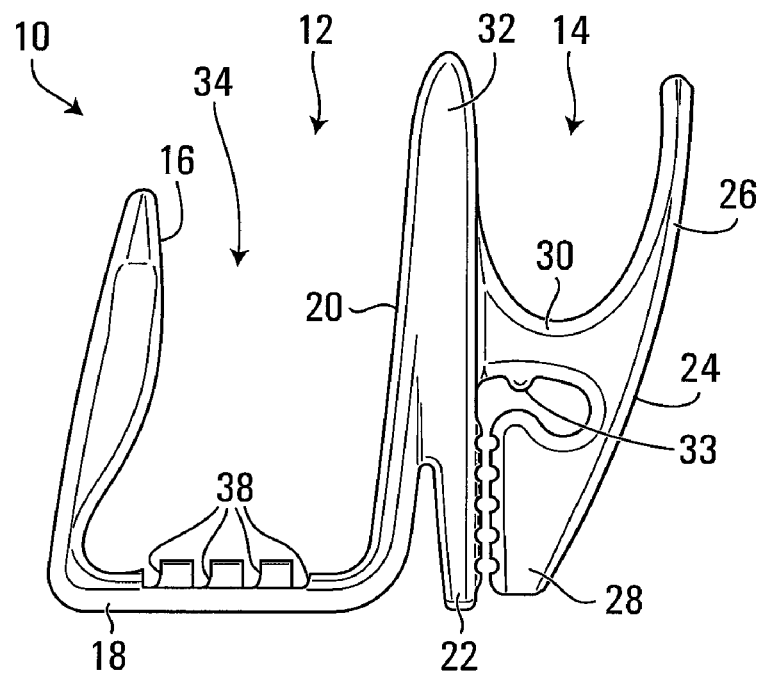
FIG. 3A shows a side elevation view of the holder shown in FIG. 1.
Figure 3B:
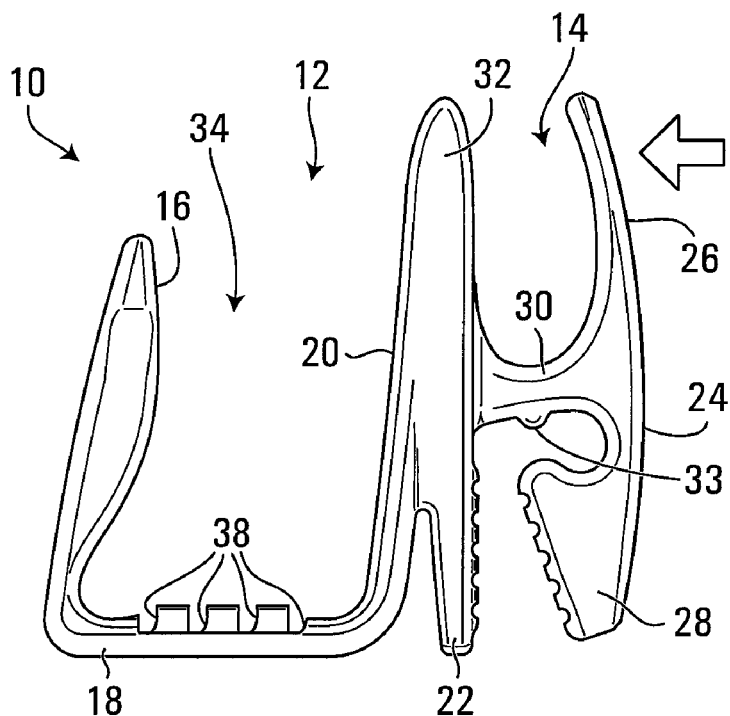
FIG. 3B shows a side elevation view of the holder shown in FIG. 1 where the holder is in an open configuration.
Figure 4:
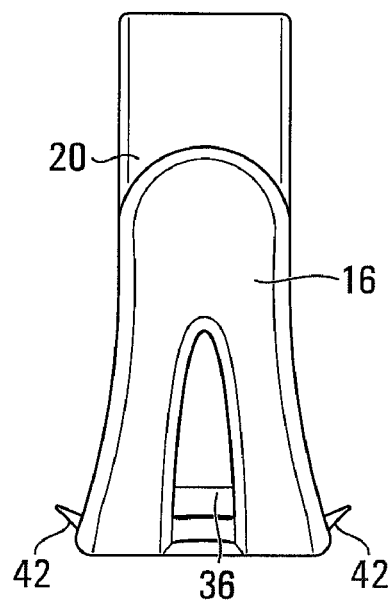
FIG. 4 shows a rear elevation view of the holder shown in FIG. 1.
Figure 5:
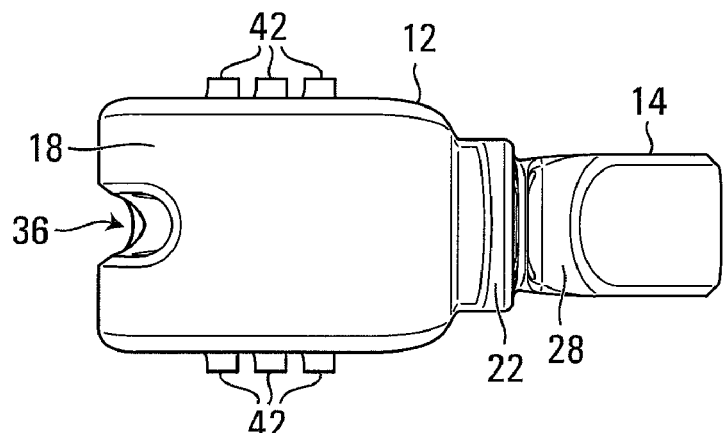
FIG. 5 shows a bottom plan view of the holder shown in FIG. 1.
Figure 6:
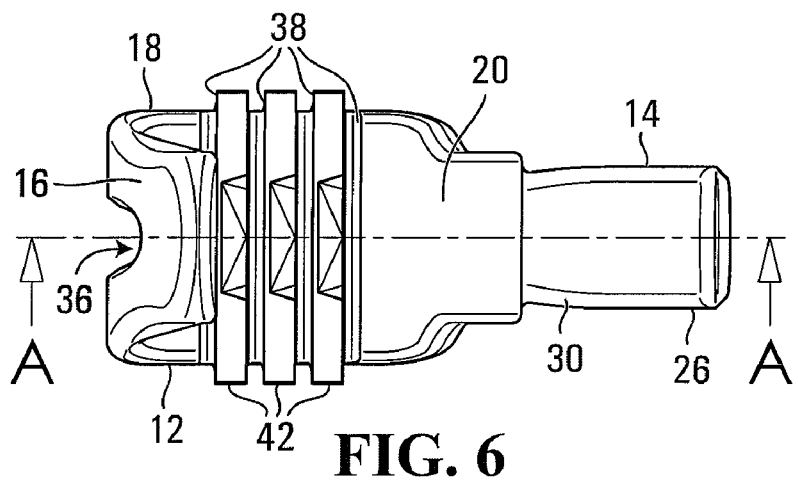
FIG. 6 shows a top plan view of the holder shown in FIG. 1.

As best shown in FIGS. 1 and 2, the first portion 12 comprises an aperture 36 for permitting condensate or other liquids present on the pot lid to drip therethrough and fall into the pot. The aperture 26 is provided at the lower end of the first wall 16, where it meets the base 18. The aperture 36 extends into the base 18 and the first wall 16. When a pot lid is being held in the first portion 12, the pot lid may be rest against the region of the base 18 adjacent the first wall 16 (and lean towards the second wall 20). In this position, liquids present on the pot lid, such as condensate, will drip down the lid towards the aperture 36, and be ejected therethrough by the force of gravity.

The second portion 14 comprises a first member 22 and a second member 24 for grasping the lateral wall of a pot between the first member 22 and the second member 24. More specifically, the second member 24 comprises a grasping portion 28 that is movable between a first position, wherein the second portion is in an open configuration and a gap is defined between the grasping portion 28 and the first member 22 (see FIG. 3B), and a second position, wherein the second portion is in a grasping configuration wherein the grasping portion is biased towards the first member 22 (see FIG. 3A).

The second member 24 also comprises an actuator for moving the grasping portion 28 between the first and second position. In the example shown, the actuator is a lever portion 26.

In the first position, the grasping portion 28 is moved away from the first member 22 such as to form a gap therebetween. When in the first position, the wall of a pot or vessel can be received between the grasping portion 28 and the first member 22. When pressure on the lever portion 26 is ceased and the wall of the pot of vessel is between the grasping portion 28 and the first member 22, the grasping portion 28 moves towards the second position where it is biased towards the first member 22 such that the wall is held between the grasping portion 28 and the first member 22 and the holder 10 is held in place when mounted on the pot or vessel.

The lever portion 26 and the grasping portion 28 act as a seesaw such that when the lever is moved towards the first member 22, the grasping portion 28 is moved away from the first member 22 and towards the first position. When the lever portion 26 is then returned to its original position away from the first member 22, the grasping portion 28 moves back towards the first member 22 to the second position. If no pot wall is received between the grasping portion 28 and the first member 22, the grasping portion 28 may abut the first member 22.

The grasping portion 28 is biased in the second position such that when it is moved away from the second position towards the first position, a biasing force acts to push the grasping portion 28 back towards the second position. Thus, when a pot wall is received between the grasping portion 28 and the first member 22, and when no external force is applied to keep the grasping portion 28 away from the second position, the grasping portion 28, under the effect of the biasing force, presses against the pot wall and holds it firmly in place.

Figure 7:
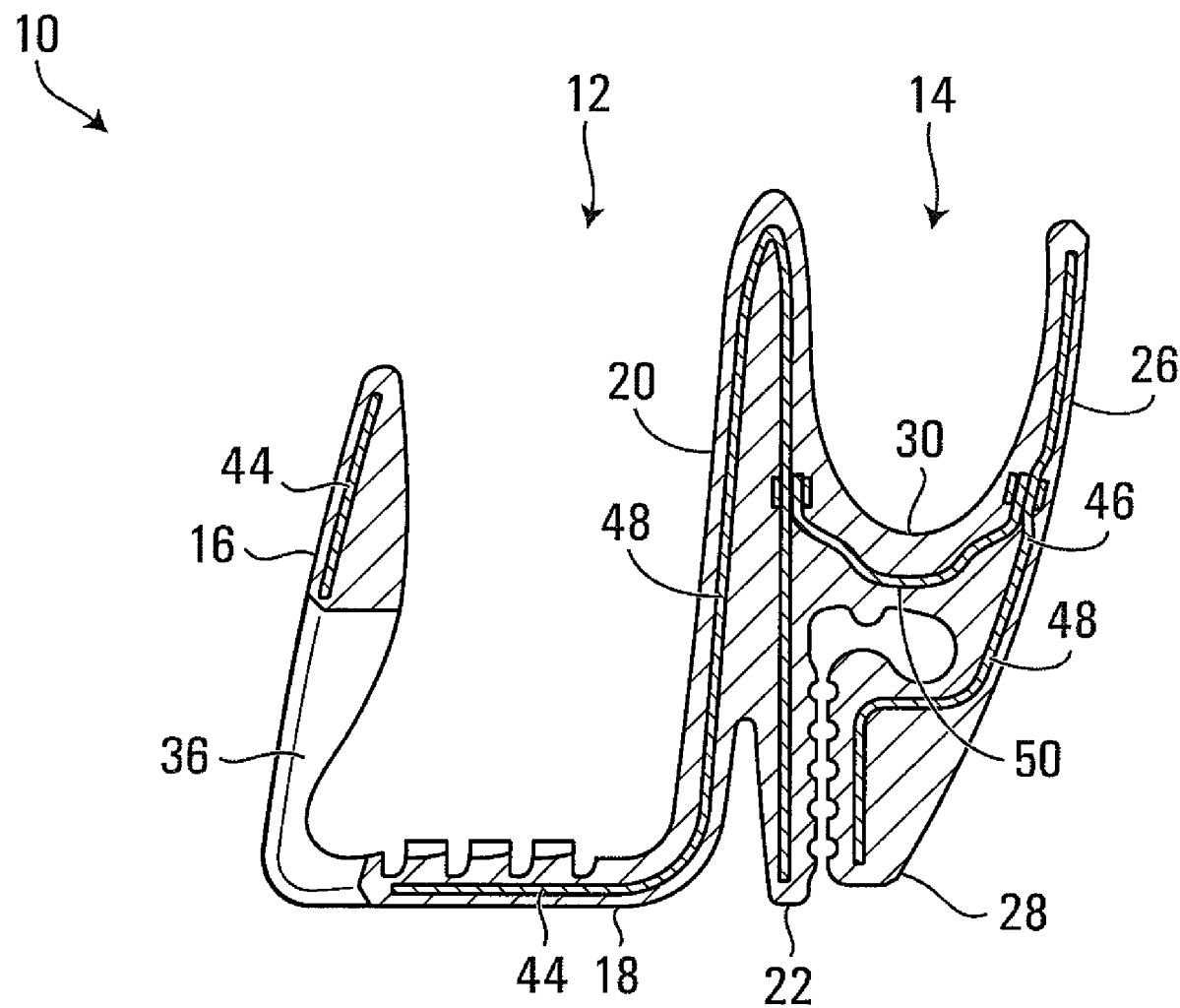
FIG. 7 shows a side cross-sectional view of the holder shown in FIG. 1, taken along line A-A.

In the present example, the second member 24 is connected to the first member 22 by a bridge 30. The bridge 30 is flexible and permits the second member 24 to move relative to the first member 22. The bridge 30 is made to be resilient such that it tends to return to an original configuration when deformed. This resiliency of the bridge 30 may be caused by the material or materials of its construction. As shown in FIG. 7, an internal member 50 may increase the biasing force of the bridge structure.

The bridge 30 is adapted to cause the grasping portion 28 to be biased towards the second position. By applying a pressure on the lever portion 26, the second member pivots deforming the bridge 30 and moving the grasping portion 28 towards the first position. Thus to move the grasping portion 28 towards the open position, a user must apply a sufficient pressure on the lever portion 26 to overcome the resiliency in the bridge 30. This resiliency will immediately act to force the second portion 14 into the grasping configuration when the lever portion 26 is released. If a pot wall was positioned between the grasping portion 28 and the first member 22 prior to releasing the lever portion 26, the pot wall will be firmly held therebetween by the biasing force applied by the bridge 30.

The first and second members 22, 24 may be of a more rigid construction than the bridge 30, such that the bridge 30 deforms more readily. Alternatively, the shape of the bridge 30 may lend itself more to the deformation manifested when the grasping portion is moved between the first and second position, than the first and second members 22, 24 such that the bridge 30, not the first and second members 22, 24 is deformed when a force is applied to the lever portion 26. When a sufficient force is applied to move the second portion 14 towards the open configuration, the lever portion 26, for example, does not bend much but the bridge 30 absorbs the applied force. It should be appreciated that many different constructions can achieve suitable rigidity differences. As shown in FIG. 7, the holder 10 has an internal structure 48 that increases the rigidity and/or resilience of the first and second members 22, 24.

It is to be understood that while in the example shown a resilient bridge 30 connects the first and second members 22, 24 together and provides the biasing force, any other means of connection and any other means of applying a bias can be used. For example, the first and second members 22, 24 may be connected by a coiled metal wire of the type used in clothespins. In such a configuration, the metal wire may provide both the connection means and the biasing force.

Alternatively, the first and second members 22, 24 may be connected by a means that allows movement but does not provide a biasing force. In such a case an additional mechanism may provide the biasing force. For example, the bridge 30 may be made of flexible but non-resilient material that does not provide a bias, or that does not bias strongly enough. Instead, the biasing force may be provided by an elastic member positioned between the grasping portion 28 and the first member 22 that pulls these two components together.

Alternatively a spring-type means may be provided above the bridge 30 that pushes the lever away from the first member 22 and thus keep the second portion 14 in the closed configuration. Any other suitable means of connecting the first and second members 22, 24 together and/or providing a biasing force may be used without departing from the intended scope of the invention.

Alternatively, the second portion 14 may not have a biasing element at all. Instead, the grasping portion 28 may move between the first and second position without the influence of a biasing force and a locking element may be engageable to hold the grasping portion 28 in place when in the second position.

The second portion 14 can clamp onto the wall of a pot such that the first portion 12 extends interiorly to the pot from the wall. In this configuration, the lid, when held in the first portion 12, is held over the pot. As best shown in FIG. 3, the bridge 30 has a bump 33 extending downwardly from its underside for helping the proper positioning of the holder 10 relative to the wall of the pot. Here the bump 33 is a ridge that extends across the underside of the bridge 30. When the second portion 14 is in the open configuration and the holder is placed onto a pot such that the wall of the pot is received between the first and second members 22, 24, the bump 33 prevents the top of the wall of the pot from being misaligned but maintains it in the proper position, which in the present example is parallel with the first member 22.

In use, upon pressure of a user on the lever portion 26 (see the pressure arrow in FIG. 3B), the grasping portion 28 moves towards the first position wherein a gap is formed between the grasping portion 28 and the first member 22 for receiving the wall of the pot or vessel such that the user can mount the holder 10 on the pot or vessel. Once the holder 10 is mounted on the pot or vessel and the user no longer applies pressure on the lever portion 26, the grasping portion moves towards the second position wherein the grasping portion 28 is biased towards the first member 22 for maintaining in place the holder 10 on the pot or vessel. Once the holder 10 is mounted and maintained in place, the user can put the lid or cover in the receiving space defined by the walls 16, 20 and base 18.

The contacting surfaces of the holder 10 may be made of a high-friction material such as an elastomeric material, many types of which are known in the art. It is understood that the base 18 must be rigid enough to withstand the weight of the pot lid. Likewise, the first and second members 22, 24 of the second portion 14 must be strong enough to clamp and hold the side of a pot. Any suitable material or combination of materials may be use to achieve the required rigidity.

In one example, shown in FIG. 7, the holder 10 comprises an external body composed of silicone, or more specifically food grade silicone, or of similar material, reinforced with a rigid internal structure 48. The rigid internal structure 48 may be composed of several internal members 44, 46, 50 for reinforcing different portions of the holder 10.

As shown in FIG. 7, the holder 10 has an external body made of food grade silicone and a rigid internal structure 48 made of metal. The rigid internal structure 48 may be composed of several internal members 44, 46, 50 for reinforcing different portions of the holder 10. In this example, the internal members 44, 46, 50 are thin metallic members and are made of stainless steel. The internal member 50 may be composed of the same material as the internal members 44, 46, particularly if its shape allows it to bend more readily than the internal member 44, 46 when the second portion 14 moves between the open and closed configurations such that only the internal member 50 bends. Alternatively the internal member 50 may be made of a different material than the internal member 44, 46, for example from a material selected for its flexibility and resiliency. The internal member 50 may be affixed to the internal members 44, 46 in any suitable way, for example using suitable fasteners as shown here, or using glue. In an alternative embodiment, the internal member 50 may be formed integrally with the internal member 44, 46, for example from a single cast, if of the same material, or by overmolding if of different materials.

The external body is injection molded over the stainless steel internal members 44, 46, 50 to form the complete holder 10. Of course, any other materials and manufacturing methods may be used and in an alternate embodiment, the holder 10 may comprise internal members that form a hard core, made, for example, of hard plastic, onto which is overmolded a softer material. The softer material may be overmolded all around the hard plastic core, or alternatively, the softer material may be overmolded only where grip is required (i.e. adjacent where the pot wall and lid are expected to be received and/or where a hand will grasp the holder). Thus the external body may be discontinuous.

In the example shown here, the first member 22 extends downwardly from the second wall 20. The first member 22 and second wall 20 are joined together at respective upper portions. As best shown in FIGS. 2 and 3, the first member 22 and second wall 20 are joined directly to one another and form together a combined portion 32 at their respective upper portions. The combined portion 32 defines both the upper portion of the second wall 20 and the upper portion of the first member 22. Here the combined portion 32 extends only along the upper portion of the second wall 20 and the first member 22, however, it is to be understood that the combined portion 32 may extend along any portion of the second wall 20 and the first member 22.

In addition to the grip grooves 38 provided on the base 18, clamp grooves 40 may be provided between the grasping portion 28 and the first member 22. The clamp grooves 40 may be any irregularity in the surface of the grasping portion 28 and/or the first member 22, including grooves, treads, ridges, depressions or protuberances, and have the effect of increasing the grip of the clamp on the pot wall.

The holder 10 has been described as being suitable for installing such that the first portion 12 extends interiorly of the pot and such that the lid is held over the pot. It is to be understood that the holder 10 may also be installed inversely such that the first portion 12 extends exteriorly of the pot from the pot wall.

Also, while generally the lid may be installed such that it rests against the base 18 and leans against the second wall 20, it is to be understood that the lid may also be leaned in the opposite direction, namely against the first wall 16. Advantageously, when the lid is leaned against the second wall 20, the lid does not cover most of the pot opening, leaving the interior of the pot accessible to tools and ingredients. Furthermore, the lid can be positioned underside-up such that condensate can drip down into the pot, as described above.

It is also to be understood that while the first member 22 is shown here as a generally straight and generally flat wall-like structure, the first member 22 may take any other suitable form and in an alternate embodiment, the first member 22 may be a mirror-image of the second member 24.

Although various embodiments have been illustrated, this was for the purpose of describing, but not limiting, the invention. Various modifications will become apparent to those skilled in the art and are within the scope of this invention, which is defined more particularly by the attached claims.

What is claimed:

1. A holder comprising:
   a) a first portion comprising a base, a first wall and a second wall, said first and second walls extending upwardly from said base such that said first and second walls and base define a space for receiving at least partially a lid or a cover; and
   b) a second portion having a first member extending downwardly from said second wall, a second member comprising a lever portion and a grasping portion and a bridge extending between said first and second members, said bridge having one end located between said lever portion and said grasping portion, wherein a gap is formed between said grasping portion and said first member for receiving a wall of a pot or vessel, and a second position, wherein said grasping portion is biased towards said first member for maintaining in place said holder when said holder is mounted on the pot or vessel.

2. A holder as defined in claim 1, wherein said bridge is made of a resilient material such that said grasping portion is biased towards said first position by the resiliency of said resilient material.

3. A holder as defined in claim 2, wherein said bridge comprises an internal member for increasing biasing of said grasping portion.

4. A holder as defined in claim 1, wherein at least a portion of said second wall and at least a portion of said first member are integrally connected together.

5. A holder as defined in claim 1, wherein said first wall and said second wall are disposed at an angle relative to said base that is between 90° and 110°.

6. A holder as defined in claim 5, wherein said base comprises at least one rib and one groove.

7. A holder as defined in claim 1, wherein either one of said first member and said grasping portion has at least one rib and one groove.

8. A holder as defined in claim 1, wherein said first portion comprises an aperture on or adjacent said base for permitting passage therethrough of a liquid dripping from the lid or cover being located in said space.

9. A holder as defined in claim 8, wherein said aperture extends along said base to said first wall and upwardly along said first wall.

10. A holder as defined in claim 1, wherein said bridge has a bump extending downwardly from its underside.

11. A holder as defined in claim 1, wherein, upon pressure of a user on said lever portion, said grasping portion moves towards said first position and wherein, when the user no longer applies pressure on said lever portion, said grasping portion moves towards said second position.

12. A holder comprising an internal member made of stainless steel and an external body made of food grade silicone, said holder being mountable on a pot or a vessel and comprising:
    a) a first portion comprising a base, a first wall and a second wall, said first and second walls extending upwardly from said base such that said first and second walls and base define a space for receiving at least partially a lid or a cover; and
    b) a second portion having a first member extending downwardly from said second wall and a second member with a bridge extending between said first and second members, said second member comprising a lever portion and a grasping portion, wherein, in use, upon pressure of a user on said lever portion, said grasping portion moves towards a first position wherein a gap is formed between said grasping portion and said first member and wherein, when the user no longer applies pressure on said lever portion, said grasping portion moves towards a second position wherein said grasping portion is biased towards said first member.

13. A holder comprising an internal member made of a first material and an external body made of a second material, said first material being more rigid than said second material, said holder being mountable on a pot or a vessel and comprising:
    a) a first portion comprising a base, a first wall and a second wall, said first and second walls extending upwardly from said base such that said first and second walls and base define a space for receiving at least partially a lid or a cover; and
    b) a second portion having a first member extending downwardly from said second wall and a second member with a bridge extending between said first and second members, said second member comprising a lever portion and a grasping portion, wherein, in use, said grasping portion is movable between a first position, wherein a gap is formed between said grasping portion and said first member for receiving a wall of a pot or vessel, and a second position, wherein said grasping portion is biased towards said first member for maintaining in place said holder when said holder is mounted on the pot or vessel.

14. A holder as defined in claim 13, wherein said first material is stainless steel.

15. A holder as defined in claim 13, wherein said second material is molded over said internal member.

16. A holder as defined in claim 13, wherein said second material is food grade silicone.

17. A holder as defined in claim 13, wherein, upon pressure of a user on said lever portion, said grasping portion moves towards said first position and wherein, when the user no longer applies pressure on said lever portion, said grasping portion moves towards said second position.

18. A holder comprising:
a) a first portion comprising a base, a first wall and a second wall, said first and second walls extending upwardly from said base such that said first and second walls and base define a space for receiving at least partially a lid or a cover and wherein said first portion comprises an aperture on or adjacent said base for permitting passage therethrough of a liquid dripping from the lid or cover being located in said space; and
b) a second portion having a first member extending downwardly from said second wall and a second member with a bridge extending between said first and second members, said second member comprising a lever portion and a grasping portion, wherein, in use, said grasping portion is movable between a first position, wherein a gap is formed between said grasping portion and said first member for receiving a wall of a pot or vessel, and a second position, wherein said grasping portion is biased towards said first member for maintaining in place said holder when said holder is mounted on the pot or vessel.

19. A holder as defined in claim 18, wherein said aperture extends along said base to said first wall and upwardly along said first wall.

* * * * *